US012447311B2

(12) United States Patent
Bar-Tal et al.

(10) Patent No.: US 12,447,311 B2
(45) Date of Patent: Oct. 21, 2025

(54) POSITION-TRACKING FOR A BALLOON CATHETER

(71) Applicant: BIOSENSE WEBSTER (ISRAEL) LTD., Yokneam (IL)

(72) Inventors: Meir Bar-Tal, Haifa (IL); Daniel Osadchy, Haifa (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 0 days.

(21) Appl. No.: 18/646,315

(22) Filed: Apr. 25, 2024

(65) Prior Publication Data
US 2024/0416076 A1   Dec. 19, 2024

Related U.S. Application Data

(60) Provisional application No. 63/521,206, filed on Jun. 15, 2023.

(51) Int. Cl.
*A61B 5/00* (2006.01)
*A61B 5/06* (2006.01)
(Continued)

(52) U.S. Cl.
CPC .......... *A61M 25/0105* (2013.01); *A61B 5/062* (2013.01); *A61B 5/6856* (2013.01); *G06T 17/00* (2013.01); *A61B 2034/2059* (2016.02)

(58) Field of Classification Search
CPC ......... A61B 5/062; A61B 5/283; A61B 5/318; A61B 5/367; A61B 5/6858; A61B 18/12; A61B 18/1492; A61B 2018/00351; A61B 2018/00577; A61B 2018/00595; A61B 2018/00613; A61B 2018/1253; A61B 2018/126; A61B 2018/1467; A61B 34/20; A61B 2034/2051; G06T 17/00; A61M 25/0105
(Continued)

(56) References Cited

U.S. PATENT DOCUMENTS 5,391,199 A   2/1995   Ben-Haim
5,443,489 A   8/1995   Ben-Haim
(Continued)

FOREIGN PATENT DOCUMENTS

EP   3922169 A1   12/2022

OTHER PUBLICATIONS

European Search Report for corresponding EPA No. 24182140.4 dated Nov. 4, 2024.

*Primary Examiner* — Boniface N Nganga (57) ABSTRACT

A system includes secondary and primary catheters, and a processor. The primary catheter includes shaft for insertion into an organ of a patient, first position sensor disposed on a distal end of the shaft, expandable assembly coupled at the distal end of the shaft, the assembly comprising hollow channel to allow passage of the secondary catheter distally via the assembly, and plurality of second position sensors disposed along a distal end of the secondary catheter, which are configured to indicate a respective plurality of positions along its distal end. The processor is configured to receive the indications of the positions, apply a model of known mechanical properties of the distal end of the secondary catheter to the positions to compute bending profile of the secondary catheter inside the assembly, and based on the computed bending profile, estimate orientation of the assembly relative to the distal end of the shaft.

12 Claims, 3 Drawing Sheets

(51) Int. Cl.
*A61M 25/01* (2006.01)
*G06T 17/00* (2006.01)
*A61B 34/20* (2016.01)

(58) Field of Classification Search
USPC .......................................... 382/294, 130, 131
See application file for complete search history.

(56) References Cited

U.S. PATENT DOCUMENTS

| | | |
|---|---|---|
| 5,558,091 A | 9/1996 | Acker et al. |
| 6,172,499 B1 | 1/2001 | Ashe |
| 6,239,724 B1 | 5/2001 | Doron et al. |
| 6,332,089 B1 | 12/2001 | Acker et al. |
| 6,484,118 B1 | 11/2002 | Govari |
| 6,618,612 B1 | 9/2003 | Acker et al. |
| 6,690,963 B2 | 2/2004 | Ben-Haim et al. |
| 6,788,967 B2 | 9/2004 | Ben-Haim et al. |
| 6,892,091 B1 | 5/2005 | Ben-Haim et al. |
| 7,536,218 B2 | 5/2009 | Govari |
| 7,756,576 B2 | 7/2010 | Levin |
| 7,848,787 B2 | 12/2010 | Osadchy |
| 7,869,865 B2 | 1/2011 | Govari |
| 8,456,182 B2 | 6/2013 | Bar-Tal |
| 8,478,379 B2 | 7/2013 | Osadchy |
| 8,478,383 B2 | 7/2013 | Bar-Tal |
| 2010/0121174 A1 | 5/2010 | Osadchy |
| 2021/0001084 A1 | 1/2021 | Highsmith |

FIG. 4

POSITION-TRACKING FOR A BALLOON CATHETER

CROSS-REFERENCE TO RELATED APPLICATION

This application claims the benefit of U.S. Provisional Patent Application 63/521,206, filed Jun. 15, 2023, which is incorporated herein by reference.

FIELD OF THE DISCLOSURE

The present disclosure relates generally to invasive medical catheters, and particularly to cardiac catheters.

BACKGROUND OF THE DISCLOSURE

Modeling the shape of invasive medical probes, such as catheters, was previously proposed in patent literature. For example, U.S. Pat. No. 8,478,379 describes a method for visualization of a probe that includes receiving an input indicative of respective apparent coordinates of a plurality of points disposed along a length of the probe inside a body of a subject, and applying a model of known mechanical properties of the probe to the apparent coordinates so as to compute a cost function with respect to shapes that can be assumed by the probe in the body. A shape is chosen responsively to the cost function, and corrected coordinates of the points along the length of the probe are generated based on the shape. The representation of the probe using the corrected coordinates is then displayed.

As another example, U.S. Pat. No. 8,478,383 describes a method including receiving an input indicative of respective apparent locations of a plurality of points disposed along a length of a probe inside a body of a subject, and applying a model of known mechanical properties of the probe to the respective apparent locations so as to minimize a first cost function with respect to shapes that can be assumed by the probe in the body. The method further includes choosing a shape responsively to the minimized first cost function and determining preliminary coordinates of the apparent locations responsively to the shape, minimizing a second cost function with respect to differences between the apparent locations and the preliminary coordinates, and generating corrected coordinates of the points along the length of the probe based on the minimized second cost function.

The present disclosure will be more fully understood from the following detailed description of the examples thereof, taken together with the drawings, in which:

DETAILED DESCRIPTION OF EXAMPLES

Overview

Examples of the present disclosure that are described herein provide means to position-track (e.g., visualize) a primary catheter comprising an expandable assembly, such as a balloon or basket assembly, inside a cavity of an organ, such as a cardiac catheter inside a heart. This primary catheter has a hollow shaft with the expandable assembly fixed to the distal end of the shaft. A first position sensor, such as a triaxial sensor (TAS), is fitted at the distal end of the shaft to indicate a position and orientation of the distal end. A secondary catheter may extend through the expandable assembly and move with respect to the expandable assembly. primary catheter The primary catheter includes a distal end assembly that is expandable, such as a balloon assembly. An example elaborated below of a secondary catheter is a lasso shaped catheter. The lasso shaped catheter is advanced distally coaxially through the expandable balloon assembly.

The physician may operate an expandable assembly with the secondary catheter. The secondary catheter helps to guide the expandable assembly to a desired location for treatment or diagnosis. The secondary catheter (also called "a guiding catheter") is more flexible and less bulky than the expandable assembly. This makes it easier and safer to maneuver within a heart chamber.

Once the desired location is found (e.g., an ostium of pulmonary vein), the expandable assembly can be directed to that location. To track its position and/or orientation, the secondary catheter typically includes a plurality of second position sensors at its distal end, e.g., 3 single axis sensors (SAS) that are magnetic based sensors. Typically, the secondary catheter further includes a plurality of electrodes. In some examples, the distal end of the secondary catheter is curved, e.g., lasso shaped in its expanded shape.

The expandable assembly is deployed and expanded at vicinity to the desired location. It is important to be able to track the locations of the electrodes so the physician can determine where the ablation will occur or where on tissue EP signals are captured. However, when a physician presses the expandable assembly against the cardiac tissue the expandable assembly may deflect. The position the of electrodes on the balloon can be significantly different due to the deflection as compared to their position without deflection. When the assembly is pressed against tissue, the positioning of the electrodes on the expandable assembly cannot therefore be inferred from the TAS on the distal end of the shaft. This is because the TAS at the distal end of the shaft does not provide any information regarding the deflection of the balloon with respect to the shaft.

The disclosed examples use the position sensors on the catheter to track the deflection of the secondary expandable assembly. The disclosed tracking technique is further based on modeling the mechanical properties of a portion of the primary catheter and on using position signals to solve the model to estimate orientation of the expandable assembly.

The disclosed technique visualizes the shape of the secondary catheter to a user as it changes in time due to a medical procedure (e.g., due to a physician manipulating the expandable assembly) and the motion of the beating heart.

The deflection of the expandable assembly with respect to the shaft is determined based on the shape of the secondary catheter.

In some examples, techniques to position-track an expandable assembly coupled at a distal end of a shaft are provided. The tracking and inside an organ visualization are provided while the expandable assembly may bend with respect to the shaft. A model is provided that extends the catheter mechanics algorithm provided in the aforementioned U.S. Pat. No. 8,478,379, to use non-fixed location sensors (not fixed to a modeled portion of the primary catheter) so they can slide relative to the primary catheter. The sensors are fixed to the secondary catheter.

A secondary catheter section inside a rigid tube within the balloon is expected to remain nearly straight do to the relatively small diameter of the tube. This is modeled by increasing the rigidity property of this section in the mechanical model. The rigidity property determines how much the cost function increases when bending this section. High rigidity results in a high-cost function value, so after cost minimization this section tends to remain nearly straight. The degree at which the model allows the secondary catheter to bend within the tube is defined by the relative diameter of the tube with respect to the secondary catheter.

In some examples, a model is provided of a lasso catheter including three SASs. A proximal magnetic based position sensor (e.g., a (TAS)) is mounted on the distal end of the shaft relative to which the lasso catheter slides. In a fully deployed form, the lasso has a nearly straight proximal base portion and a curved distal portion that forms a lasso shape. As the lasso base portion slides beside the TAS sensor, the three free parameters (to be determined), as specified in U.S. Pat. No. 8,478,379, of a cost function of the disclosed model represent the position, the orientation, and the shape of the secondary catheter and the position of the TAS sensor relative to some predetermined position. Specifically, a new free parameter, the length of the portion of the secondary catheter the slid distally past the TAS, in addition to the parameters in U.S. Pat. No. 8,478,379 represents the displacement of the TAS relative sensor to some predetermined position (for example—one of the SAS positions). The cost function is minimized with respect to all free parameters giving the position, orientation and shape of the secondary catheter secondary catheter which best fits all sensor measurements and the catheter mechanical properties.

The catheter mechanics algorithm framework is used to interpolate between the measure location over the secondary catheter (in one example, the secondary catheter is a lasso catheter) to obtain its shape. The estimated shape of the secondary catheter extending through the balloon and the positions of the position sensors mounted on the secondary catheter may be used to estimate and/or predict the balloon orientation and/or deflection instead of working under the assumption of no balloon deflection. In particular, after estimating the lasso secondary catheter shape, based on the SAS and TAS sensors, the processor estimates the balloon position and orientation. To this end, the processor uses the TAS sensor's known location at the base of the balloon, along with the fact that the lasso secondary catheter extends through the central distal edge of the balloon.

When the lasso is only partially extended through the expandable assembly, such that at least one of the SAS is inside a hollow channel inside the expandable assembly, the estimation is even more accurate, since the interpolated part of the lasso secondary catheter secondary catheter contains at least one SAS inside the assembly.

System Description

Figure 1:
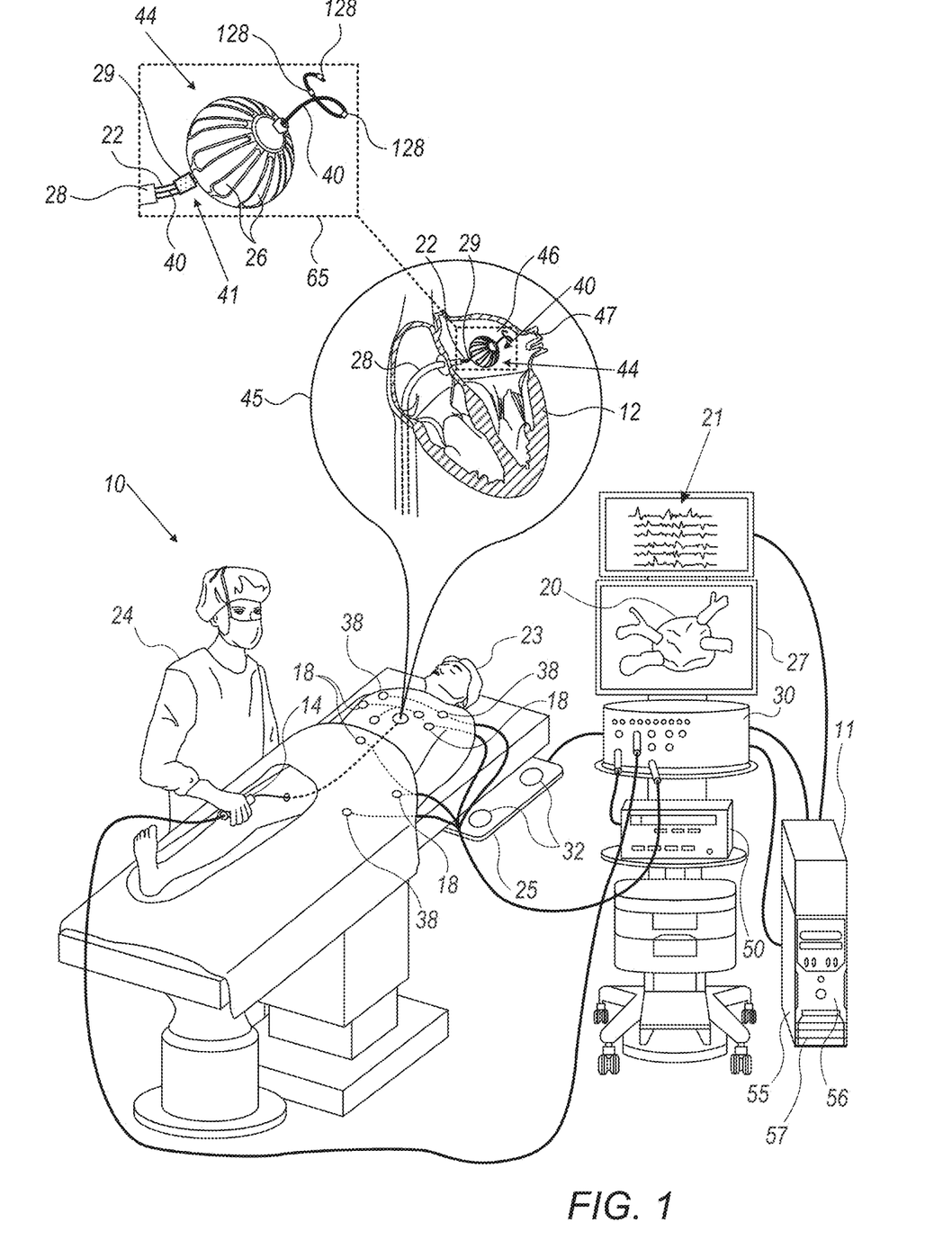
FIG. 1 is a schematic, pictorial illustration of a catheter-based electrophysiology (EP) mapping and ablation system, in accordance with an example of the present disclosure.

FIG. 1 is a schematic, pictorial illustration of a catheter-based electrophysiology (EP) mapping and ablation system 10, in accordance with an example of the present disclosure.

System 10 includes multiple catheters, which are percutaneously inserted by physician 24 through the patient's vascular system into a chamber or vascular structure of a heart 12.

Typically, a delivery sheath 28 catheter is inserted into the left or right atrium near a desired location in heart 12. Thereafter, a plurality of catheters can be inserted into delivery sheath 28 so as to arrive at the desired location. In inset 45, a balloon catheter 14 is shown inserted via sheath 28 using a shaft 22 into a left atrium 46 of a heart 12.

The plurality of catheters may include catheters dedicated for sensing intracardiac electrograms (IEGM) and/or for both sensing and ablating, as well as imaging catheters. An example balloon catheter 14 that is configured for sensing IEGM and to perform electrical ablation is illustrated herein. As further seen in inset 45, physician 24 brings an expandable (e.g., balloon) assembly 44 fitted on shaft 22 of catheter 14 into contact with the heart wall for ablating a target site in heart 12, such as an ostium 47 of a pulmonary vein.

As seen in inset 45, a secondary catheter secondary catheter 40 having a section that has assumed a pre-shaped form of a lasso catheter is passed distally to the balloon via a hollow channel inside expandable assembly 44 (channel shown in FIG. 2). The secondary catheter secondary catheter is used to guide and position the balloon at ostium 47 of the pulmonary vein. In addition, the spiral portion of the secondary catheter secondary catheter comprises a plurality of sensing electrodes disposed thereon (not shown) for acquiring IEGM around the wall of the pulmonary vein in the vicinity of the ostium.

As seen in inset 65, balloon catheter 14 is an exemplary catheter that includes one, and preferably multiple, electrodes 26 distributed evenly over a circumference of expandable assembly 44 and configured to sense the IEGM signals and perform ablation. Catheter 14 additionally includes (i) a secondary catheter secondary catheter 40 configured to assume a pre-shape of a lasso catheter when advanced distally of expandable assembly 44, the secondary catheter secondary catheter having a generally curved base portion (which can be straight in a blood pool) and a lasso spiral portion, (ii) three magnetic position sensors 128 disposed over a distal end of secondary catheter secondary catheter 40, and (iii) a proximal position sensor 29 disposed over a distal end 41 of shaft 22 near expandable assembly 44 for tracking a position of distal end 41 of shaft 22 and for tracking the orientation of the distal end of shaft 22.

Magnetic-based position sensors 29 and 128, which are further described in FIG. 2, may be operated together with a location pad 25 including a plurality of magnetic coils 32 configured to generate magnetic fields in a predefined working volume. Details of the magnetic-based position-sensing technology are described in U.S. Pat. Nos. 5,5391,199; 5,443,489; 5,558,091; 6,172,499; 6,239,724; 6,332,089; 6,484,118; 6,618,612; 6,690,963; 6,788,967; 6,892,091.

System 10 includes one or more electrode patches 38 positioned for skin contact on patient 23 to establish references for location pad 25 as well as location impedance-based tracking functionality of electrodes 26. For impedance-based tracking, electrical current is directed toward electrodes 26 and sensed at electrode skin patches 38 so that the location of each electrode can be triangulated via electrode patches 38. Details of the impedance-based location-tracking technology are described in U.S. Pat. Nos. 7,536,218; 7,756,576; 7,848,787; 7,869,865; and 8,456,182.

A recorder 11 displays electrograms 21 captured with body surface ECG electrodes 18 and intracardiac electrograms (IEGM) captured with electrodes 26 of catheter 14. Recorder 11 may include pacing capability for pacing the heart rhythm and/or may be electrically connected to a standalone pacer.

System 10 may include an ablation energy generator 50 that is adapted to conduct ablative energy to one or more electrodes at a distal tip of a catheter configured for ablation. Energy produced by ablation energy generator 50 may include, but is not limited to, radiofrequency (RF) energy or pulsed-field ablation (PFA) energy, including monopolar or bipolar high-voltage DC pulses as may be used to affect irreversible electroporation (IRE), or combinations thereof.

Patient interface unit (PIU) 30 is an interface configured to establish electrical communication between catheters, electrophysiological equipment, power supply and a workstation 55 for controlling system 10 operation. Electrophysiological equipment of system 10 may include, for example, multiple catheters, location pad 25, body surface ECG electrodes 18, electrode patches 38, ablation energy generator 50, and recorder 11. Optionally and preferably, PIU 30 additionally includes processing capability for implementing real-time computations of catheter locations and for performing ECG calculations.

Workstation 55 includes a processor 56 unit with a memory 57, or storage with appropriate operating software loaded therein, and user interface capability. Workstation 55 may provide multiple functions, optionally including (i) modeling endocardial anatomy in three-dimensions (3D) and rendering the model or anatomical map 20 for display on a display device 27, (ii) displaying on display device 27 activation sequences (or other data) compiled from recorded electrograms 21 in representative visual indicia or imagery superimposed on the rendered anatomical map 20, (iii) displaying real-time locations and orientations of multiple catheters within the heart chamber, and (iv) displaying on display device 27 sites of interest such as places where ablation energy has been applied. One commercial product embodying elements of system 10 is available as the CARTO™ 3 System, available from Biosense Webster, Inc., 31A Technology Drive, Irvine, CA 92618.

Position-Tracked Balloon Catheter with Sliding Lasso Secondary Catheter Secondary Catheter As noted above, an example of a primary catheter is a balloon catheter. An example of a secondary catheter is a lasso shaped catheter. As described above, the lasso shaped catheter is coaxially extended through the expandable balloon assembly.

As described above, the disclosed technique purpose is to track orientation (or the deflection) of the expandable assembly with respect to its shaft. Two examples are discussed:
1. Detection when at least one SAS that is mounted on the secondary catheter is in the expandable assembly and then determine the orientation by comparing the orientation of the shaft (known from the TAS) and the orientation of the SAS.
2. When the SASs are outside the assembly, determining orientation of the expandable assembly by drawing a virtual line between the centroid of all 3SASs and the 3D position of the TAS and comparing orientation of that line to orientation of the TAS.

Figure 2A:
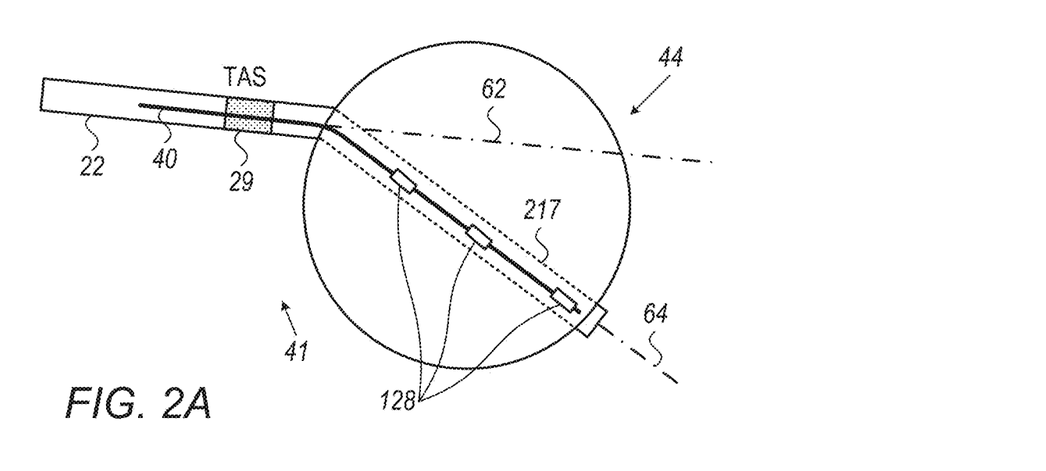
FIGS. 2A and 2B are schematic pictorial illustrations of the primary catheter and a secondary catheter extending therethrough the primary catheter of FIG. 1 at two deployment states of the, in accordance with examples of the present disclosure.
Figure 2B:
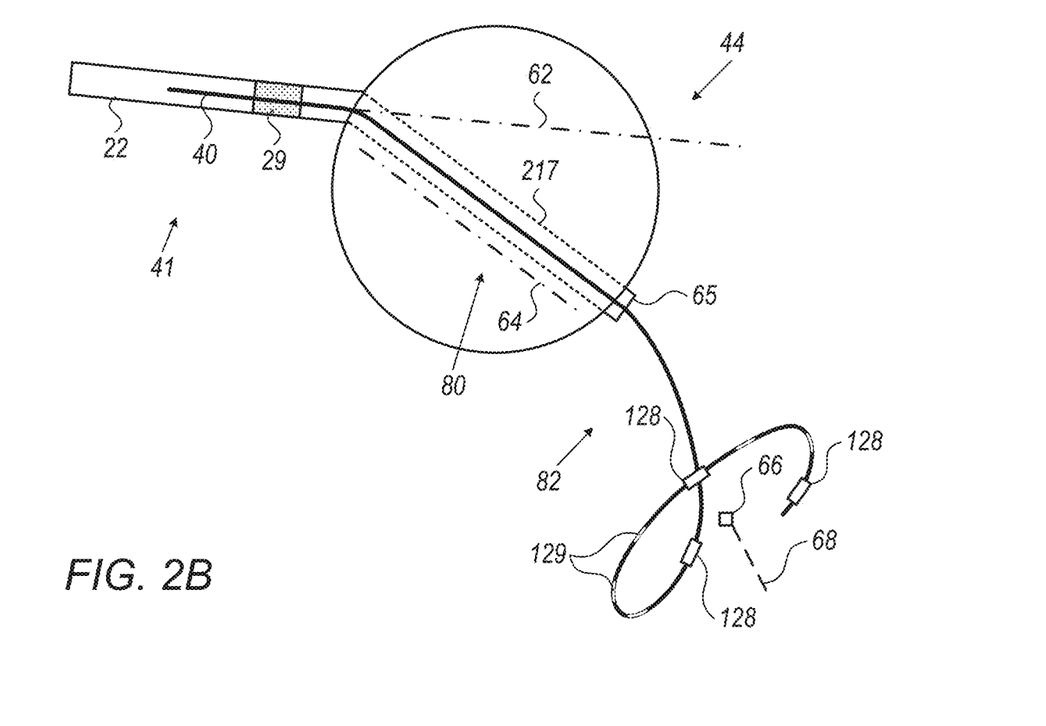

FIGS. 2A and 2B are schematic pictorial illustrations of the primary catheter 14 and a secondary catheter 40 extending therethrough the primary catheter 14 of FIG. 1 at two deployment states of the, in accordance with examples of the present disclosure.

Primary catheter 14 includes an expandable balloon assembly 44, while secondary catheter 40 is lasso shaped catheter 40. The orientation of balloon assembly 44 without forces exerted on it is given by a longitudinal axis 62, where longitudinal axis 62 is defined as the orientation parallel to the distal end portion 41 of shaft 22. Axis 62 orientation is thus known from TAS 29. As seen, in practice balloon 44 may be deflected and oriented off axis 62, e.g., along a deflected orientation 64 relative to that of the distal end 41 of shaft 22.

In FIG. 2A, secondary catheter secondary catheter 40 is seen partially advanced via shaft 22, e.g., only to a point where the secondary catheter secondary catheter is still fully inside a hollow channel 217 of expandable assembly 44. In FIG. 2B, secondary catheter secondary catheter 40 is fully advanced via shaft 22 so that the distal end of secondary catheter secondary catheter 40 is fully deployed distally of expandable balloon assembly 44 and has regained its pre-shaped lasso form.

Catheter 14 includes a TAS 29 disposed on shaft 22 of the balloon catheter. Using TAS 29, processor 56 tracks the position and orientation of the distal end of the shaft in three dimensions (3D). In particular, using signals from TAS 29, processor 56 can determine an orientation of longitudinal axis 62 in the 3D coordinate system defined by location pad 25.

The balloon catheter additionally includes a lasso secondary catheter fitted through the axis of the balloon. Optionally, the lasso catheter 82 includes one or more electrodes that may be used for capturing electrophysiological (EP) signals in the heart chamber. The lasso mapping catheter includes three SASs 128 to track positions of, for example, electrodes 129 fitted on the lasso (e.g., such as described in U.S. Patent Application Publication 2021/0001084, which is assigned to the assignee of the current application).

In FIG. 2A, as secondary catheter secondary catheter 40 is only partially advanced, the SAS sensors 128 are still inside hollow channel 217 within expandable assembly 44. It is sufficient that one SAS is inside hollow channel 217 for processor 56 to estimate deflection orientation 64 from SAS output signals, and subsequently deduce orientation 64 of balloon 44 relative to the distal end of shaft 22 (e.g., relative to orientation 62).

As seen, the deflection is schematically shown as an orientation 64 that is largely parallel to a longitudinal axis along rigid channel 217. In the example of FIG. 2A, secondary catheter secondary catheter 40 is largely straight. One or more SAS are known to be inside the balloon, based on the estimated distance between the SAS positions and TAS 29 as compared to the known length of rigid channel 217. The amount of balloon deflection is deduced from the deflection of secondary catheter secondary catheter 40 inside rigid channel 217 using readings from TAS 29 and SASs 128.

In FIG. 2B, section 80 of secondary catheter secondary catheter 40, which is inside balloon 44, is straight along a to-be-determined deflected orientation 64. A typically curved distal section 82 is located between a distal tip (e.g., distal pole of a balloon having sphere shape) 65 of the balloon and an estimated average position 66 of a center point of the lasso. Position 66 and orientation 68 (i.e., orientation 58) at position 66 are estimated from signals provided by SASs 128 when deployed in the lasso configuration.

Orientation 64 is deduced using the model described using FIG. 3 below that is applied to the entire secondary catheter secondary catheter based on output from TAS 29 and each of SAS sensors 128. A centroid 66 of position of SASes 128 is estimated.

A Model of Balloon Catheter Orientation

Figure 3:
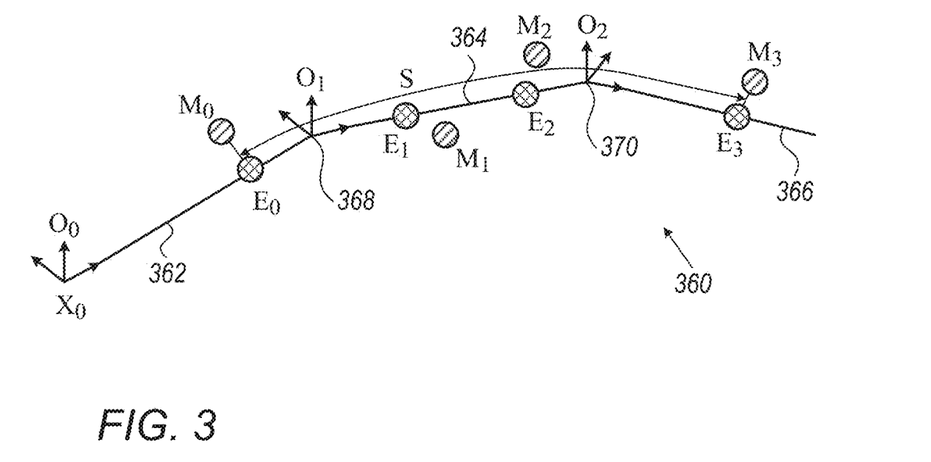
FIG. 3 is a schematic pictorial illustration of a model geometry of the secondary catheter such as that in FIG. 2, in accordance with an example of the present disclosure.

FIG. 3 is a schematic illustration of a model 360 geometry of a secondary catheter such as of FIG. 2, in accordance with an example of the present disclosure. In model 360, points $E_0$, $E_1$, $E_2$ and $E_3$ represent calculated locations of position sensors based on the measured locations of points $M_0$, $M_1$, $M_2$ and $M_3$. $M_0$ data point is from the TAS 29 that is not fixed to the secondary catheter, while data points $M_1$-$M_3$ are from the SAS 128. There is an inherent accuracy limitation to any position measurement (e.g., 1 mm) that the model must overcome. The model thus calculates points E1, E2 and E3 (inferred from the measurements) that are assumed fixed to the shaft while point E0 can slide on the shaft. The amount of slide is represented as S, which in this example represents the distance (on shaft) to a fixed point E3. A cost function in accordance with an example of the present disclosure is used to find the best match between points $E_j$ and $M_j$. Model 630 comprises straight rigid sections 362, 364 and 366, connected by joints 368 and 370 that allow rotation (bending and twisting). The position of section 362 is described by position matrix $x_0$, and the orientation of section 62 is given by a matrix $O_0$.

Orientation matrix $O_0$ is a local reference frame of section 362 with its $\hat{x}$ and $\hat{y}$ axes being perpendicular to section 362, and the $\hat{z}$ axis pointing along section 362. Section 364 starts at the end of section 362 (i.e., via connecting joint 368), and its orientation is given by matrix $O_1$. Section 366 starts at the end of section 364 (i.e., via connecting joint 370), and its orientation is given by matrix $O_2$. Matrices $O_0$, $O_1$ and $O_2$ describe the actual state (i.e., shape) of the primary catheter, wherein external forces cause the primary catheter to deviate from its free state (i.e., in which no external forces are applied to the primary catheter). Although model geometry 360 comprises three sections, alternative model geometries may comprise either fewer than three or more than three sections.

With reference to FIG. 2, position vector $x_0$ and the orientation matrix $O_0$ relate to TAS 29 and orientation 62, respectively. Position vector $x_3$ and the orientation matrix $O_3$ relate to average position 66 and orientation 68, respectively, calculated from SASs 128 signals. Position vector $x_2$ and the orientation matrix $O_2$ measurements are absent and are weighted zero in the relevant equation below.

The secondary catheter physical properties that affect its shape are defined by the parameters {N, $L_k$, $G_k(d)$, $P_k$, and S} wherein:

N: Number of sections.

$L_k$: Section lengths (need not be equal), 0≤k<N.

$G_k(d)$: Rotation matrix as a function of the deflection parameters d for deflectable primary catheters (or a constant matrix for pre-shaped primary catheters), 1≤k<N. This matrix represents the relative rotation between section k and section (k−1) when no external forces are applied (i.e., primary catheter free shape).

$P_k$: List of position sensors, e.g., SASs on section k, where 0≤k<N. Each position transducer is represented by its distance from the section start, its type (for example, ACL electrode, SAS or TAS magnetic sensor). The list for each section can contain any number of position transducers, including zero.

S: the distance on shaft from a fixed point to a sliding sensor

The physical properties of the secondary catheter are described by parameters {$A_k$, $B_k$} which represent the resistance (e.g., stiffness or rigidity) of a joint between section k and section (k−1) against bending and twisting, respectively.

As a physician moves the catheter in a patient, the processor receives position signals from sensors at regular intervals. For each measurement of position based on the position sensors, the processor generates a corresponding position measurement, which can include a position vector (all types of transducers), single axis sensor (SAS) and/or full orientation (TAS). The measurement parameters include:

$M_j$: Position measurement.

$M_j^{or}$: Orientation measurement.

The processor applies a cost function to calculate the quality of the match between the primary catheter model and received position data. This match defines the shape of the primary catheter with the lowest cost according to the model, which in turn gives corrected coordinates of the points along the length of the secondary catheter that correspond to the locations of the position transducers. The secondary catheter state, as determined by the processor, describes its location and shape and its deflection values. The state is given by the variables {$x_0$, $r_k$, d}:

$x_0$: The position of the first section starting point (i.e., in FIG. 3).

$r_k$: The orientation of section k relative to section k−1 for 0<k<N and the global orientation of the first section for k=0:

$$r_k \equiv \begin{cases} O_{k-1}^T \cdot O_k & 0 < k < N \\ O_0 & k = 0 \end{cases}$$

d: The values of the deflection parameters (for deflectable primary catheters). These values do not affect the position and shape of the secondary catheter, but they do affect the calculation of the cost function and thus the outcome of the secondary catheter mechanics algorithm.

The processor applies a minimization algorithm to the function in order to find a minimal cost primary cost catheter state that achieves a minimum value of the cost function (i.e., a best match).

The cost function has three parts: intrinsic energy, position error and orientation error. First, the processor calculates an intrinsic energy score, which represents the deviation of the secondary catheter from its free shape (or a family of free shapes parameterized by deflection variables for deflectable primary catheters). For joints 368 and 370, the orientation difference between the actual relative orientation and the current deflection is calculated as:

$$dr_k = r_k^T \cdot G_k(d) \qquad (1)$$

The processor converts this orientation difference to the bend and twist angles:

$$\{\alpha_k, \beta_k\} = \text{Angles}(dr_k) \qquad (2)$$

The processor calculates the intrinsic energy score using the primary catheter model parameters $\{A_k, B_k\}$:

$$E^{int} = \sum_{k=1}^{N-1} A_k \alpha_k^2 + B_k \beta_k^2 \quad (3)$$

The processor then calculates a position error score, which represents the position error between the locations of the position transducers given by the primary catheter model and state, and the actual measurements. The processor denotes the position of the position sensors according to the primary catheter model and state as $E_j$ and the corresponding measurements as $M_j$, and calculates the weighted position error as follows:

$$E^{pos} = \sum_{j=0}^{P} w_j \|E_j - M_j\|^2 \quad (4)$$

where P is the number of position transducers, and $w_j$ is a weight adjusted as the algorithm runs.

The processor then calculates an orientation error score, which represents the orientation error between the position of position sensors, given by the primary catheter model and state, and the actual measurements received. The orientation of the various points along the secondary catheter, represented by the model, is a discontinuous function, which has abrupt changes at model joints (unlike the position). After calculating the orientations of all of the relevant position sensors $E_j^{or}$ according to the model, the processor calculates the angular difference with respect to the measured orientation $M_j^{or}$:

$$\{\alpha_j, \beta_j\} = \text{Angles}\left(E_j^{or^T} \cdot M_j^{or}\right) \quad (5)$$

and the total weighted orientation error:

$$E^{or} = \sum_{j=0}^{P-1} w_j \left(\alpha_j^2 + \beta_j^2\right) \quad (6)$$

The processor then calculates a cost function as a weighted combination of the three parts (i.e., intrinsic energy, position error and orientation error):

$$\text{Cost}(x_0, r_k, d) = \lambda^{int} E^{int} + \lambda^{pos} E^{pos} + \lambda^{or} E^{or} \quad (7)$$

The values $\{\lambda^{int}, \lambda^{pos}, \lambda^{or}\}$ describe the relative importance of deviation of the secondary catheter from its free shape vs. the position and orientation errors.

As discussed supra, the processor minimizes the function cost $\{x_0, r_k, d\}$ with respect to the primary catheter state variables in order to achieve the best match between the primary catheter model and the actual measurements received. The minimization can be done by any suitable numerical method. In one example of the present disclosure, the processor uses the Broyden-Fletcher-Goldfarb-Shanno (BFGS) minimization algorithm.

Since minimizing the cost function employs an iterative algorithm (i.e., each iteration of the algorithm improves the estimate of the solution), and the position and shape of the secondary catheter change slowly between measurements, the inventors have found that it is usually sufficient to apply only one iteration of the cost function minimization algorithm for each successive measurement.

Improved Position-Tracking Method for a Balloon Catheter

Figure 4:
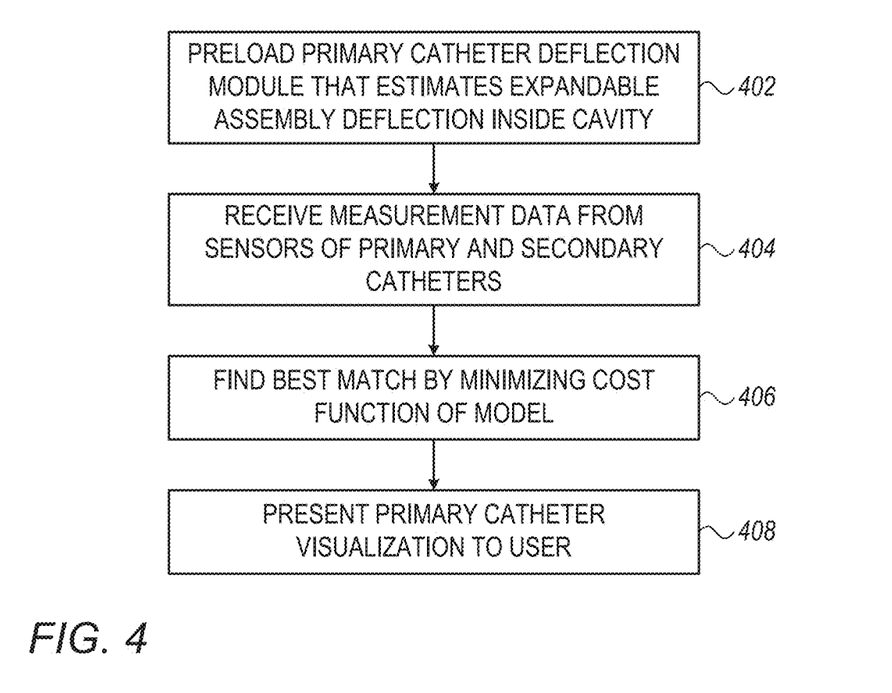
FIG. 4 is a flow chart that schematically illustrates a method to position-track and visualize the balloon catheter of FIG. 1 when the secondary catheter is deployed, in accordance with examples of the present disclosure.

FIG. 4 is a flow chart that schematically illustrates a method to position-track and visualize balloon 44 catheter 14 of FIG. 1 when the secondary catheter 40 is deployed, in accordance with examples of the present disclosure. The physician starts the clinical procedure by inserting expandable assembly 44 via a sheath into a cardiac cavity of a patient and expanding the expandable assembly therein. The algorithm, according to the presented example, carries out a process that begins with primary catheter deflection module preloaded to processor 56, at a module loading step 402. Typically, the deflection module will be available in a common menu of the mapping and ablation system.

Processor 56 can then receive relevant measurement data from position sensors 29 and 128 of, respectively, primary catheter 14 and secondary catheter 40, at position data receiving step 404.

At catheter positioning step 406, the physician manipulates the catheter to bring the electrodes mounted on the distal portion of the basket assembly into firm contact with tissue, so as to ablate target tissue (e.g., an ostium of a pulmonary vein). At this stage, the distance S between TAS 29 and SAS 128 is known so processor 56 can identify when the SAS is inside and when it is outside expandable assembly 44.

Finally, at a primary catheter visualization step 408, after determining the minimal cost primary catheter state, the processor presents a map of a cardiac cavity on display 27, showing the position and orientation of balloon 44 inside the cavity.

The flow chart shown in FIG. 4 is chosen purely for the sake of conceptual clarity. The present example may also comprise additional steps of the algorithm, such as estimating contact force of balloon 44 against tissue. This and other possible steps are omitted from the disclosure herein purposely to provide a more simplified flow chart.

EXAMPLES

Example 1

A system (10) includes a secondary catheter (40), a primary catheter (14), and a processor (56). The primary catheter (14) includes (i) a shaft (22) for insertion into an organ of a patient, (ii) a first position sensor (29) disposed on a distal end of the shaft, (iii) an expandable assembly (44) coupled at the distal end of the shaft (22), the expandable assembly (44) comprising a hollow channel (217) to allow passage of the secondary catheter (40) distally via the expandable assembly (44), and (iv) a plurality of second position sensors (128) disposed along a distal end of the secondary catheter (40), which are configured to indicate a respective plurality of positions along the distal end of the secondary catheter (40). The processor (560 is configured to (i) receive the indications of the plurality of positions, (ii) apply a model of known mechanical properties of the distal end of the secondary catheter (40) to the plurality of positions to compute a bending profile of the secondary catheter (40) inside the expandable assembly (44), and (iii) based on the computed bending profile, estimate an orientation of the expandable assembly (44) with respect to the distal end of the shaft (22).

Example 2

The system (10) according to example 1, wherein a distal portion of the distal end of the secondary catheter (40) is configured to, upon exiting the hollow channel (217), regain a pre-shaped lasso form.

Example 3

The system (10) according to claim 1, wherein one or more of the position sensors (128) are magnetic position sensors disposed over the distal end of the secondary catheter (40).

Example 4

The system (10) according to claim 1, wherein the expendable assembly (44) is an expandable balloon.

Example 5

The system (10) according to claim 1, wherein the model of known mechanical properties of the secondary catheter (40) comprises (i) multiple sections (362, 364, 366) of the secondary catheter (40), (ii) a length of each of the sections, (iii) a rotation matrix defining relative rotation of each of the sections with regard to a preceding section, and (iv) the plurality of positions on the secondary catheter (40).

Example 6

The system (10) according to claim 1, wherein the processor (56) is configured to apply the model of known mechanical properties of the distal end of the secondary catheter (40) by assuming that at least one section (362) of the secondary catheter is located inside a straight rigid channel (217) of the expandable assembly (44).

Example 7

The system (10) according to claim 1, wherein the processor (56) is further configured to display the orientation of the expandable assembly (44) to a user.

Example 8

A method includes receiving indications of a plurality of positions from a first position sensor (29) disposed on a distal end of a shaft (22) for insertion into an organ of a patient, the distal end of the shaft (22) is coupled with an expandable assembly (44) comprising a hollow channel (217) to allow passage of a secondary catheter (40) distally via the expandable assembly (44), and from a plurality of second position sensors (1280 disposed along a distal end of the secondary catheter (40). A model of known mechanical properties of the distal end of the secondary catheter (40) is applied to the plurality of positions to compute a bending profile of the secondary catheter (40) inside the expandable assembly (44). Based on the computed bending profile, an orientation is estimated of the expandable assembly (44) with respect to the distal end of the shaft (22).

Although the examples described herein mainly address cardiac diagnostic applications, the methods and systems described herein can also be used in other medical applications.

It will be appreciated that the examples described above are cited by way of example, and that the present disclosure is not limited to what has been particularly shown and described hereinabove. Rather, the scope of the present disclosure includes both combinations and subcombinations of the various features described hereinabove, as well as variations and modifications thereof which would occur to persons skilled in the art upon reading the foregoing description and which are not disclosed in the prior art.

The invention claimed is:

1. A system, comprising:
   a secondary catheter;
   a primary catheter, comprising:
      a shaft for insertion into an organ of a patient;
      a first position sensor disposed on a distal end of the shaft;
      an expandable assembly coupled at the distal end of the shaft, the expandable assembly comprising a hollow channel that is straight and rigid to allow passage of the secondary catheter distally via the expandable assembly; and
      a plurality of second position sensors disposed along a distal end of the secondary catheter, which are configured to indicate a respective plurality of positions along the distal end of the secondary catheter; and
   a processor, which is configured to:
      receive the indications of the plurality of positions;
      apply a model of known mechanical properties of the distal end of the secondary catheter to the plurality of positions to compute a bending profile of the secondary catheter inside the expandable assembly, wherein the model is applied based on an assumption that at least one section of the secondary catheter is located inside the hollow channel; and
      based on the computed bending profile, estimate an orientation of the expandable assembly with respect to the distal end of the shaft.

2. The system according to claim 1, wherein a distal portion of the distal end of the secondary catheter is configured to, upon exiting the hollow channel, regain a pre-shaped lasso form.

3. The system according to claim 1, wherein one or more of the position sensors are magnetic position sensors disposed over the distal end of the secondary catheter.

4. The system according to claim 1, wherein the expendable assembly is an expandable balloon.

5. The system according to claim 1, wherein the model of known mechanical properties of the secondary catheter comprises (i) multiple sections of the secondary catheter, (ii) a length of each of the sections, (iii) a rotation matrix defining relative rotation of each of the sections with regard to a preceding section, and (iv) the plurality of positions on the secondary catheter.

6. The system according to claim 1, wherein the processor is further configured to display the orientation of the expandable assembly to a user.

7. A method, comprising:
   receiving indications of a plurality of positions from a first position sensor disposed on a distal end of a shaft for insertion into an organ of a patient, the distal end of the shaft is coupled with an expandable assembly comprising a hollow channel that is straight and rigid to allow passage of a secondary catheter distally via the expandable assembly, and from a plurality of second position sensors disposed along a distal end of the secondary catheter;
   applying a model of known mechanical properties of the distal end of the secondary catheter to the plurality of positions to compute a bending profile of the secondary catheter inside the expandable assembly, wherein the model is applied based on an assumption that at least one section of the secondary catheter is located inside the hollow channel; and based on the computed bending profile, estimating an orientation of the expandable assembly with respect to the distal end of the shaft.

8. The method according to claim 7, wherein a distal portion of the distal end of the secondary catheter is configured to, upon exiting the hollow channel, regain a pre-shaped lasso form.

9. The method according to claim 7, wherein one or more of the position sensors are magnetic position sensors disposed over the distal end of the secondary catheter.

10. The method according to claim 7, wherein the expendable assembly is an expandable balloon.

11. The method according to claim 7, wherein the model of known mechanical properties of the secondary catheter comprises (i) multiple sections of the secondary catheter, (ii) a length of each of the sections, (iii) a rotation matrix defining relative rotation of each of the sections with regard to a preceding section, and (iv) the plurality of positions on the secondary catheter.

12. The method according to claim 7, and comprising displaying the orientation of the expandable assembly to a user.

* * * * *